July 7, 1953  C. F. BACHLE  2,644,541
PRESSURIZED CHAMBER FOR AIR-COOLED ENGINES
Filed July 10, 1947  2 Sheets-Sheet 1

INVENTOR.
CARL F. BACHLE
BY
Hauke, Hardesty & Schmidt
ATTORNEYS.

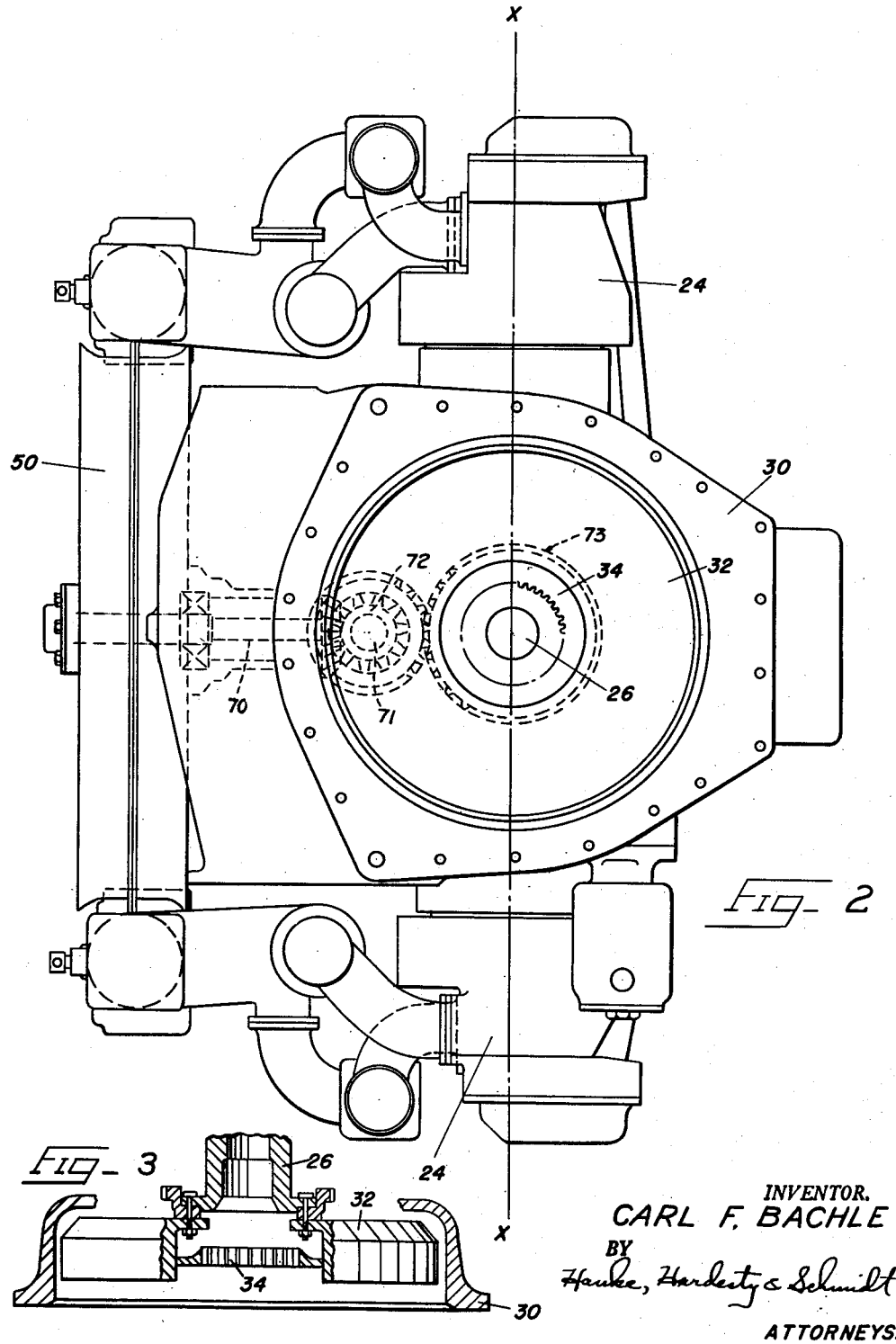

Patented July 7, 1953

2,644,541

UNITED STATES PATENT OFFICE 2,644,541

PRESSURIZED CHAMBER FOR AIR-COOLED ENGINES

Carl F. Bachle, Detroit, Mich., assignor to Continental Motors Corporation, Detroit, Mich., a corporation of Virginia Application July 10, 1947, Serial No. 759,985

3 Claims. (Cl. 180—54)

This invention relates to an automotive vehicle, especially to the arrangement of the power plant in the vehicle.

An important consideration in vehicle design, especially in the design of trucks, tractors, and other cargo carriers, is the space taken up by the power plant.

It is an object of this invention to provide an automotive vehicle having a power plant which is so designed and so mounted as to occupy a minimum of space in the vehicle. This is accomplished in an engine having opposed cylinders, the pistons of which operate on a common crankshaft, the engine being mounted with its crankshaft substantially vertical; power from the engine is transmitted to a transmission through a right angle drive. For maximum efficiency, the engine is air cooled and is mounted in a pressurized chamber at the extreme forward end of the vehicle. An opening in the forward face of the chamber serves as an air inlet. A fan or blower driven by the engine is mounted in the air inlet.

In the drawings:

Fig. 2 is a view in section substantially on line 2—2 of Fig. 1, except that the connection between the crankshaft and bevel gear 36 has been omitted, and Fig. 3 is a detail sectional view through the flywheel and crankshaft end.

Figure 1:
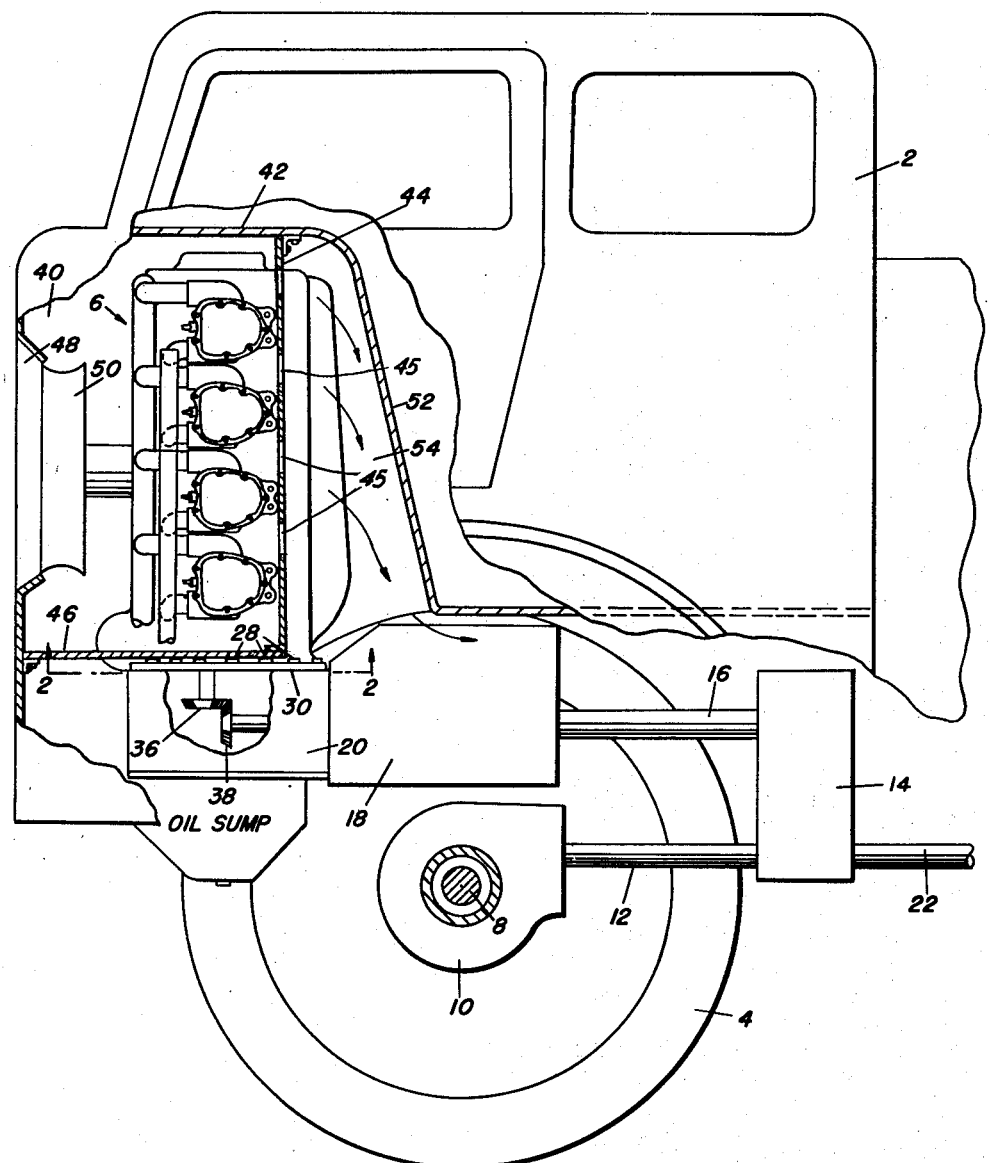
Fig. 1 is a view in elevation of an automotive vehicle powered with an engine according to the invention, with parts broken away and in section to show details of the invention.

In Fig. 1 there is shown an automotive vehicle such as a heavy duty truck or other cargo carrier having an operator's cab 2 and a plurality of road wheels one of which is shown at 4. One or more of the road wheels is driven by the engine 6 through a power train comprising an axle 8, a differential 10, a drive shaft 12, a transfer case 14, an intermediate drive shaft 16, a transmission 18, and a power transmitter or right angle drive 20. The vehicle shown is intended to be one in which all road wheels are driven. Wheels to the rear of the transfer case 14 are driven by the rear drive shaft 22.

The engine 6 comprises a plurality of cylinders 24 (here shown as 8 in number) arranged to oppose each other to operate on a common crankshaft 26 disposed between the two rows of cylinders. As is best seen in Fig. 2, the axes of the cylinders lie substantially in a common plane indicated by the line X—X.

As is evident from Fig. 1, the right angle drive or power transmitter 20 is mounted ahead of transmission 18 and is carried by the frame by any suitable mounting means. The internal combustion engine 6 is mounted on top of power transmitter 20 by means of bolts 28 extending through a flange 30 into the power transmitter. The fastening of flange 30 to the power transmitter 20 by means of bolts 28 may constitute the sole means of support of the engine; if desired, however, additional mounting means may be provided, as for example by securing the engine itself directly to one or more frame members.

A flywheel 32 is secured by any suitable means to crankshaft 26. Flywheel 32 is recessed centrally and carries in its recess an internally splined member 34. An externally splined member, not shown, is adapted to mesh with the internal splines of member 34 to be rotatable thereby. The externally splined member referred to drives a bevel gear 36 which meshes with a second bevel gear 38. The two gears 36 and 38 constitute what may be known as a power transmitter or more specifically, a right angle drive. Gear 38 is connected to transmit power to transmission 18.

Engine 6 is mounted in a pressurized chamber 40 which is formed in part by some of the walls of engine compartment 42 and in part by a rear wall or partition 44 and a bottom wall 46.

The forward face of the pressurized chamber 40 is open to provide an air inlet 48. Engine 6 is preferably air cooled and drives a fan or blower 50 which rotates immediately to the rear of air inlet 48 about a substantially horizontal axis. Air is drawn into chamber 40 through inlet 48 by fan 50 and leaves the chamber through openings 45 in the back wall or partition 44. The space between the partition 44 and the rearmost face 52 of engine compartment 42 serves as an air duct 54.

The specific details of construction of partition 44, the air outlet openings through this partition, and other structural details covering the flow of cooling air are not shown or claimed in this application, but are disclosed and claimed in a separate application Serial Number 791,639, filed December 13, 1947 (now Patent No. 2,581,996, granted January 8, 1952), and assigned to the assignee of this invention.

The blower 50 is mounted on shaft 70 driven from shaft 71 by beveled gears 72, said shaft being driven from the engine crankshaft through suitable spur gears 73. Obviously any conventional drive for drivingly connecting said blower to the crankshaft 26 may be utilized.

Operation

In operation, power from the engine crankshaft 26 is transmitted to transmission 18 through the right angle drive consisting of gears 36 and 38. From the transmission, power goes to the transfer case 14 through the intermediate drive shaft 16. From the transfer case, power goes to the forward wheels through shaft 12 and to the rear wheels by means of shaft 22.

The internal combustion engine shown is one having two opposed banks of cylinders, the axis of the cylinders lying in a common plane. The engine is mounted solely on the right angle drive 20 so that its crankshaft is substantially vertical. The engine is thus mounted in a pressurized chamber 40 which is disposed at the extreme forward end of the vehicle. Air is forced into chamber 40 by means of fan or blower 50 through the inlet 48 and leaves through suitable openings 45 in partition 44 whence it passes into the air duct 54 and flows downward to pass out to the atmosphere under the vehicle.

I claim:

1. In an automotive vehicle, an air-cooled internal combustion engine having a vertically extending crankshaft and a plurality of horizontally disposed engine cylinders extending in a plane normal to the longitudinal axis of the vehicle, an engine housing enclosing said engine and having a partition dividing it into a pressure chamber at the extreme forward end of the vehicle forwardly of said engine and an exhaust air chamber to the rear of said engine, said partition having apertures affording communication between said chambers, and said housing also having a forward wall provided with an inlet opening for admitting air to said pressure chamber, a fan in said air inlet opening and connected to be driven by the engine to force cooling air into said pressure chamber, said exhaust air chamber having an outlet opening disposed at the bottom to discharge the air generally downwardly, said cooling air for said engine being circulated generally longitudinally of the vehicle by said fan through said pressure chamber and past said engine cylinders and thence through said partition apertures into and generally downwardly through the air exhaust chamber for exhausting through said outlet opening.

2. In an automotive vehicle, an air cooled internal combustion engine having a vertically extending crankshaft and a plurality of horizontally disposed engine cylinders extending in a plane normal to the longitudinal axis of the vehicle, an engine housing enclosing said engine and having a partition dividing it into a pressure chamber at the extreme forward end of the vehicle forwardly of said engine and an exhaust air chamber to the rear of said engine, said partition having apertures affording communication between said chambers, and said housing also having a forward wall provided with an inlet opening for admitting air to said pressure chamber, a fan in said air inlet opening and connected to be driven by the engine to force cooling air into said pressure chamber, said exhaust air chamber having an outlet opening disposed at the bottom to discharge the air generally downwardly, a gear box and a right angle drive mechanism carried within said gear box, said engine being mounted directly on said gear box and said crankshaft extending into said gear box and directly connected with said right angle drive mechanism, and a transmission drivingly connected with said right angle drive mechanism and disposed to the rear thereof and immediately below said air exhaust chamber, said cooling air for said engine being circulated generally longitudinally of the vehicle by said fan through said pressure chamber and past said engine cylinders and thence through said partition apertures into and generally downwardly through the air exhaust chamber for exhausting through said outlet opening directly over said transmission.

3. In an automotive vehicle, an air cooled internal combustion engine having a vertically extending crankshaft and a plurality of horizontally disposed engine cylinders extending a plane normal to the longitudinal axis of the vehicle, an engine housing enclosing said engine and having a partition dividing it into a pressure chamber at the extreme forward end of the vehicle forwardly of said engine and an exhaust air chamber to the rear of said engine, said partition having apertures affording communication between said chambers, and said housing also having a forward wall provided with an inlet opening for admitting air to said pressure chamber, a fan in said air inlet opening and connected to be driven by the engine to force cooling air into said pressure chamber, said exhaust air chamber having an outlet opening disposed at the bottom to discharge the air generally downwardly, a gear box and a right angle drive mechanism carried within said gear box, said engine being mounted directly on said gear box and said crankshaft extending into said gear box and directly connected with said right angle drive mechanism, a transmission drivingly connected with said right angle drive mechanism and disposed to the rear thereof and immediately below said air exhaust chamber, said cooling air for said engine being circulated generally longitudinally of the vehicle by said fan through said pressure chamber and past said engine cylinders and thence through said partition apertures into and generally downwardly through the air exhaust chamber for exhausting through said outlet opening directly over said transmission, said vehicle having a floor extending in a horizontal plane disposed immediately above said transmission, said engine housing extending generally above the plane of the vehicle floor, and a front axle for said vehicle lying immediately below said transmission, said engine, gear box and engine housing containing said pressure chamber and said air exhaust chamber being disposed generally forwardly of the front vehicle axle.

CARL F. BACHLE.

References Cited in the file of this patent

UNITED STATES PATENTS

| Number | Name | Date |
|---|---|---|
| 989,615 | Lake | Apr. 18, 1911 |
| 1,295,793 | Rautenstrauch | Feb. 25, 1919 |
| 1,781,322 | Delling | Nov. 11, 1930 |
| 2,105,153 | Ledwinka | Jan. 11, 1938 |
| 2,126,876 | Doman | Aug. 16, 1938 |
| 2,247,742 | Best | July 1, 1941 |
| 2,396,506 | Harris | Mar. 12, 1946 |

FOREIGN PATENTS

| Number | Country | Date |
|---|---|---|
| 692,336 | France | July 29, 1930 |
| 874,295 | France | Aug. 3, 1942 |
| 585,264 | Germany | Sept. 30, 1933 |
| 512,050 | Great Britain | Nov. 25, 1937 |